(12) United States Patent
Imamura

(10) Patent No.: US 8,457,462 B2
(45) Date of Patent: Jun. 4, 2013

(54) MULTI-CORE OPTICAL FIBER

(75) Inventor: Katsunori Imamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 155 days.

(21) Appl. No.: 12/843,302

(22) Filed: Jul. 26, 2010

(65) Prior Publication Data

US 2010/0290750 A1    Nov. 18, 2010

Related U.S. Application Data

(63) Continuation of application No. PCT/JP2009/068909, filed on Nov. 5, 2009.

(30) Foreign Application Priority Data

Dec. 25, 2008    (JP) .................................. 2008-331212

(51) Int. Cl.
*G02B 6/02*    (2006.01)
*G02B 6/036*   (2006.01)

(52) U.S. Cl.
USPC ....................................................... 385/126

(58) Field of Classification Search
USPC ......................................... 385/123, 125, 126
See application file for complete search history.

(56) References Cited

U.S. PATENT DOCUMENTS

| | | | |
|---|---|---|---|
| 5,675,681 A * | 10/1997 | Chiaretti et al. ................. | 385/59 |
| 6,301,420 B1 * | 10/2001 | Greenaway et al. .......... | 385/126 |
| 7,492,999 B2 | 2/2009 | Imamura | |
| 7,609,928 B2 | 10/2009 | Imamura | |
| 7,613,374 B2 | 11/2009 | Imamura | |
| 7,657,141 B2 | 2/2010 | Imamura | |
| 7,693,379 B2 | 4/2010 | Imamura | |
| 7,742,671 B2 | 6/2010 | Koyamada et al. | |
| 7,773,845 B2 | 8/2010 | Imamura | |
| 7,845,860 B2 * | 12/2010 | Fiorentino et al. .............. | 385/89 |
| 2008/0219667 A1 | 9/2008 | Imamura | |
| 2009/0046984 A1 | 2/2009 | Mukasa | |
| 2009/0324242 A1 | 12/2009 | Imamura | |
| 2010/0054742 A1 | 3/2010 | Imamura | |
| 2010/0150507 A1 | 6/2010 | Takahashi et al. | |

FOREIGN PATENT DOCUMENTS

| | | |
|---|---|---|
| JP | 62-178909 | 8/1987 |
| JP | 63-33102 | 3/1988 |
| JP | 63-128502 | 8/1988 |
| JP | 9-71431 | 3/1997 |
| JP | 2008-534995 | 8/2008 |
| WO | WO 2006/100488 A1 | 9/2006 |
| WO | WO 2008/093870 A1 | 8/2008 |

OTHER PUBLICATIONS

U.S. Appl. No. 13/045,039, filed Mar. 10, 2011, Imamura.

(Continued)

*Primary Examiner* — Uyen Chau N Le
*Assistant Examiner* — Michael Mooney
(74) *Attorney, Agent, or Firm* — Oblon, Spivak, McClelland, Maier & Neustadt, L.L.P.

(57) ABSTRACT

A multi-core optical fiber includes: a plurality of core portions; and a cladding portion positioned around the plurality of core portions and including, in a cross section of the cladding portion, a flat portion in at least a part of an outer periphery of the cladding portion and a remaining portion of the outer periphery that is circular, the cross section being perpendicular to a longitudinal direction of the cladding portion.

5 Claims, 4 Drawing Sheets

OTHER PUBLICATIONS

Katsunori Imamura et al., "Multi-core holey fibers for ultra large capacity wide-band trasmission", with English language, 2008 Nen Proceedings of the Society Conference of IEICE 2, Sep. 2, 2008, 5 pages.

U.S. Appl. No. 12/846,028, filed Jul. 29, 2010, Imamura.
U.S. Appl. No. 12/846,113, filed Jul. 29, 2010, Takahashi, et al.
U.S. Appl. No. 13/238,902, filed Sep. 21, 2011, Imamura.
U.S. Appl. No. 13/360,853, filed Jan. 30, 2012, Imamura.

* cited by examiner

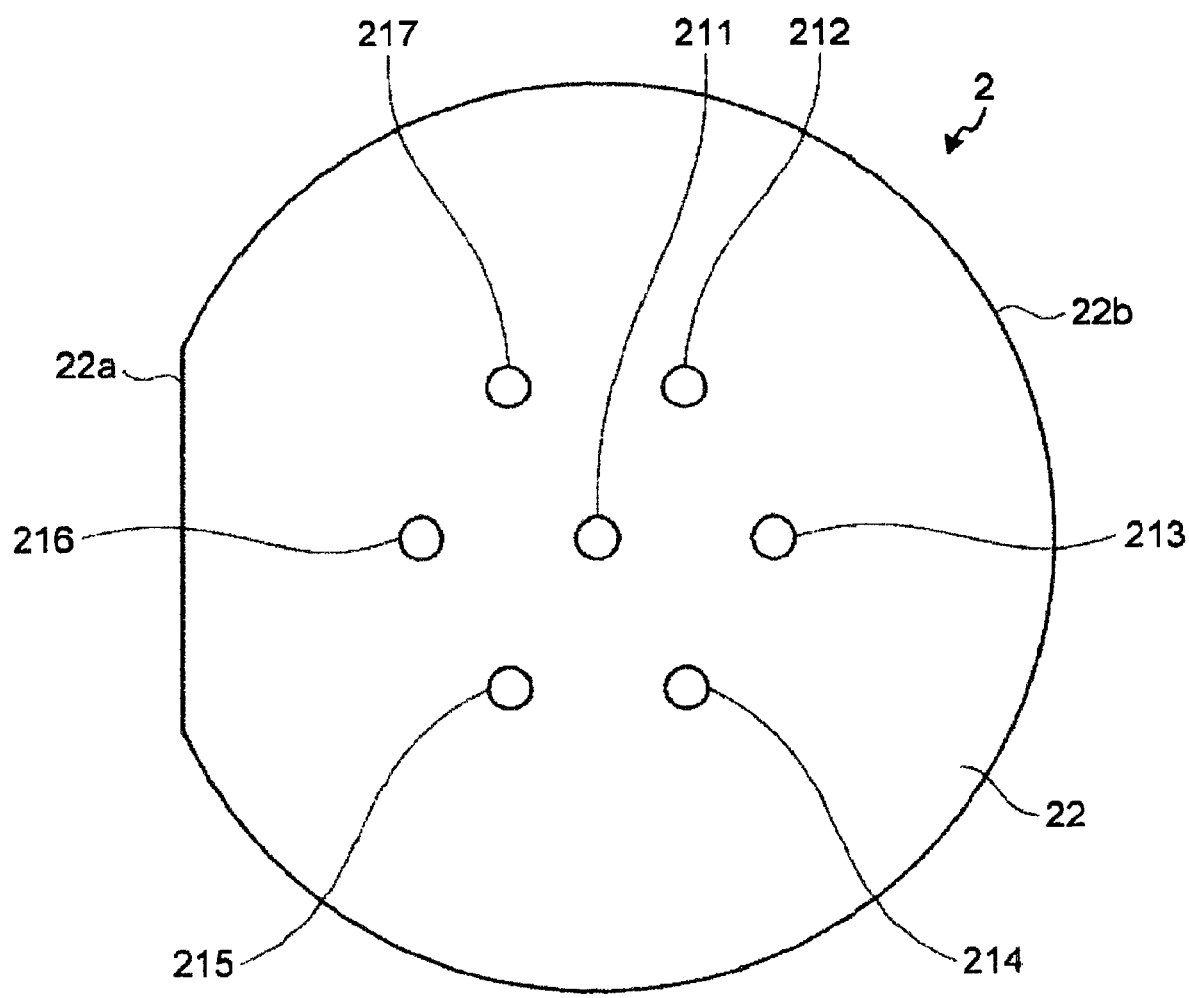

MULTI-CORE OPTICAL FIBER

CROSS-REFERENCE TO RELATED APPLICATIONS

This application is a continuation of PCT International Application No. PCT/JP2009/068909 filed on Nov. 5, 2009 which claims the benefit of priority from Japanese Patent Application No. 2008-331212 filed on Dec. 25, 2008, the entire contents of which are incorporated herein by reference.

BACKGROUND OF THE INVENTION

1. Field of the Invention

The present invention relates to a multi-core optical fiber having a plurality of core portions.

2. Description of the Related Art

As means for remarkably increasing communication capacity, multi-core optical fibers, each having a plurality of core portions, have been disclosed.

As one type of the multi-core optical fibers, a multi-core holey fiber is disclosed (see Japanese National Publication of International Patent Application No. 2008-534995). This holey fiber is an optical fiber that has core portions and a cladding portion positioned around the core portions and having a plurality of holes arranged around the core portions. In the holey fiber, an average refractive index of the cladding portion is reduced by the holes, and the principle of total reflection of light is utilized to confine the light to the core portions and to propagate the light (see International Publication Pamphlet No. WO2008/093870). Because the refractive index is controlled by the holes, the holey fiber is able to realize endlessly single mode (ESM) characteristics realizing single mode transmission at all wavelengths and unique properties such as anomalous dispersion at shorter wavelengths. A multi-core holey fiber is a holey fiber having a plurality of core portions, and is thought of as being possible to realize SDM transmission in addition to the ESM characteristics.

DISCLOSURE OF INVENTION

Problem to be Solved by the Invention

When the multi-core optical fiber is connected to another multi-core optical fiber or to an optical device by fusion splicing or the like, it is necessary to connect a specific core portion of the multi-core optical fiber and a specific core portion of the another multi-core optical fiber or the optical device.

However, in the multi-core optical fiber, a plurality of core portions may be arranged symmetrically about a central axis, because of demand for uniformity in optical characteristics among the core portions and demand for ease of manufacture. When the plurality of core portions are arranged symmetrically about the central axis like that, there is a problem that it is difficult to identify a specific core portion by the appearance.

SUMMARY OF THE INVENTION

It is an object of the present invention to at least partially solve the problems in the conventional technology.

According to an aspect of the present invention, a multi-core optical fiber includes: a plurality of core portions; and a cladding portion positioned around the plurality of core portions and including, in a cross section of the cladding portion, a flat portion in at least a part of an outer periphery of the cladding portion and a remaining portion of the outer periphery that is circular, the cross section being perpendicular to a longitudinal direction of the cladding portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic cross-sectional view of a multi-core optical fiber according to a second embodiment.

DETAILED DESCRIPTION OF THE PREFERRED EMBODIMENTS

Embodiments of a multi-core optical fiber according to the present invention will be explained in detail below with reference to the drawings. The present invention is not limited by the embodiments. In addition, those terms, which are not particularly defined in this specification, follow the definitions and measurement methods defined by ITU-T (International Telecommunication Union Telecommunication Standardization Sector) G.650.1.

First Embodiment

Figure 1:
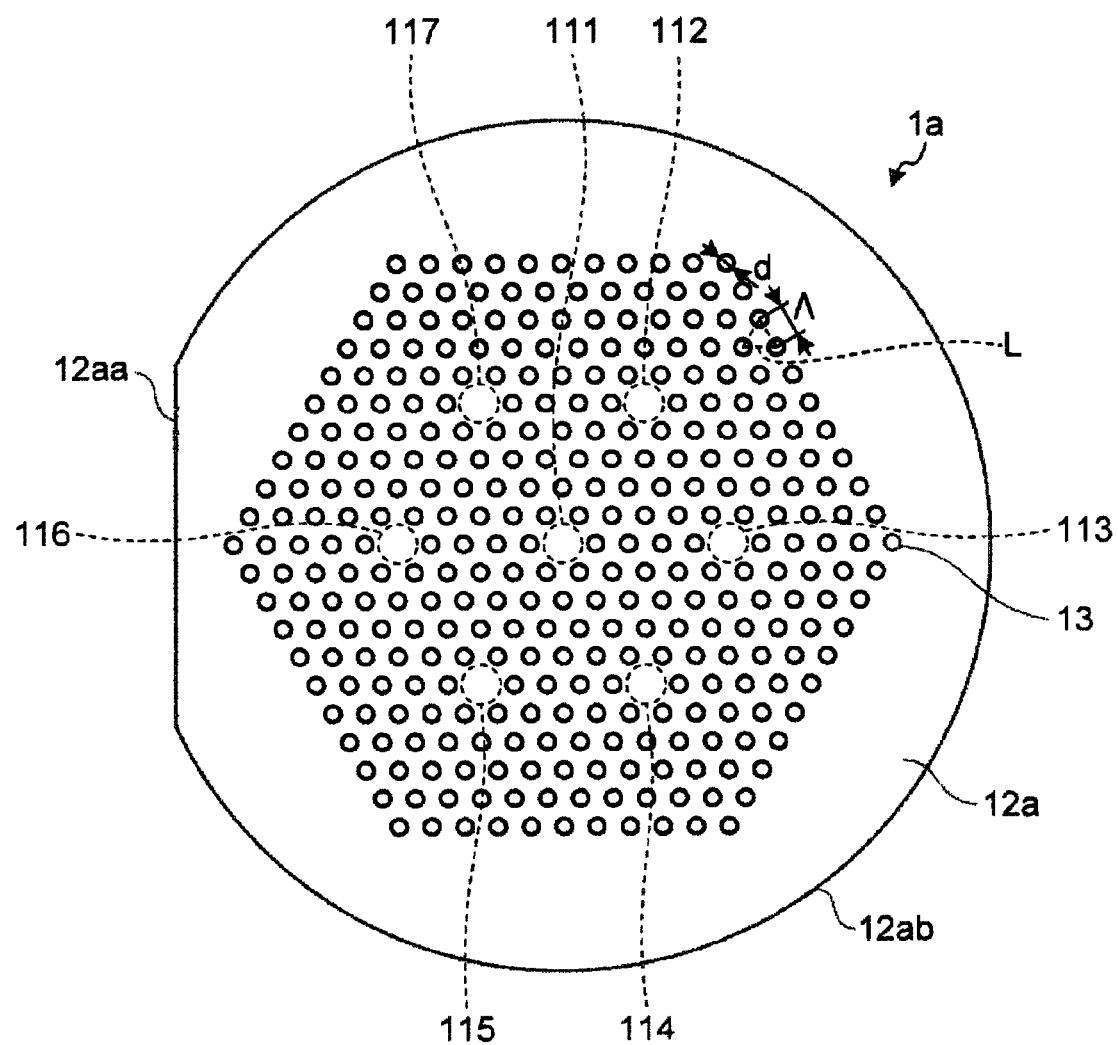
FIG. 1 is a schematic cross-sectional view of a multi-core HF according to a first embodiment.

FIG. 1 is a schematic cross-sectional view of a multi-core holey fiber (multi-core HF) according to a first embodiment of the present invention. A cross section illustrated in FIG. 1 is a cross section perpendicular to a longitudinal direction of a multi-core HF 1a. As illustrated in FIG. 1, the multi-core HF 1a includes core portions 111 to 117 which are arranged separated from each other and a cladding portion 12a positioned around the core portions 111 to 117. The core portions 111 to 117 and the cladding portion 12a are made of silica-based glass such as pure silica glass not containing any dopant for adjusting a refractive index.

The core portion 111 is arranged at an approximate center portion of the cladding portion 12a, and the core portions 112 to 117 are arranged at respective apexes of an equilateral hexagon around the core portion 111. The cladding portion 12a includes a plurality of holes 13 periodically arranged around the core portions 111 to 117. The holes 13 are arranged so as to form a triangular lattice L, and form equilateral hexagonal layers so as to surround each of the core portions 112 to 117. Moreover, in the multi-core HF 1a, the core portions 111 to 117 are surrounded by at least holes 13 of five layers, and four holes 13 are each present between the core portions 111 to 117.

The multi-core HF 1a is configured to confine light to each of the core portions 111 to 117 by the holes 13 to propagate the light. A diameter d [μm] of the holes 13 and a lattice constant $\Lambda$ [μm] of the triangular lattice L are not particularly limited and are set appropriately according to desired optical characteristics. For example, if $d/\Lambda$ is 0.35 to 0.65 and $\Lambda$ is 10 μm, then similarly to the HF disclosed in International Publication Pamphlet No. WO2008/093870, ESM characteristics are realized for each of the core portions 111 to 117 at least at a wavelength of 1260 nm to 1610 nm. Furthermore, at a wavelength of 1550 nm, an effective core area Aeff becomes large at approximately 114.6 µm$^2$, and a bending loss upon bending with a diameter of 20 mm becomes small at approximately 1.6 dB/m, and thus, an optical fiber with reduced optical nonlinearity and suitable for cabling is realized.

Here, the outer periphery of the cladding portion 12a includes a flat portion 12aa in a part thereof, and a remaining portion 12ab is circular.

As explained above, in the multi-core HF 1a, the core portion 111 is arranged at the approximate center portion of the cladding portion 12a, and the core portions 112 to 117 are arranged at respective apexes of the equilateral hexagon around the core portion 111, and thus, it is difficult to identify a specific core portion of the core portions 112 to 117 only by the arrangement of the core portions 111 to 117. However, because the multi-core HF 1a includes the flat portion 12aa in the part of the outer periphery of the cladding portion 12a, it becomes easy to identify a specific core portion on the basis of the position of the flat portion 12aa. Although the width of the flat portion 12aa is not particularly limited, if an outer diameter of the cladding portion 12a of the multi-core HF 1a is, for example, approximately 125 µm, the flat portion 12aa of a width of 30 to 90 µm may be formed in the longitudinal direction.

As explained above, because the multi-core HF 1a includes the flat portion 12aa in the part of the outer periphery of the cladding portion 12a, it becomes easy to identify a specific core portion from the core portions 112 to 117, allowing easy connection to another multi-core optical fiber or the like.

If, for example, the multi-core HFs 1a are to be connected to each other using fusion splicing, connector connection, or mechanical splice connection, the following method, for example, is used. More specifically, in a state in which end faces of, for example, two multi-core HFs 1a are placed opposite to each other, a mirror or a prism is inserted between the end faces of the two multi-core HFs 1a. Then, at least one of the two multi-core HFs 1a is rotated around the central axis while the end faces of the two multi-core HFs 1a, which become observable from the outside by the mirror or the prism, are being observed, and, based on the positions of the flat portions 12aa, a rotational position is determined so that, for example, the core portions 116 are connected to each other. Thereafter, the two multi-core HFs 1a are connected to each other.

In the connection method, light is passed through a specific core portion of the multi-core HFs 1a, for example, through the core portion 116, a light receiver is connected to a core portion 116 at an end face opposite to a to-be-connected-to end face of the other multi-core HF 1a, and then a connection may be performed while intensity of the light received by the light receiver is being monitored. In this case, the flat portions 12aa are used for coarse adjustment of rotational positions of the two multi-core HFs 1a, and fine adjustment of the rotational positions is performed by a light intensity monitor, and thus quick and easy coarse adjustment and accurate fine adjustment are possible.

(First Modification)

Figure 2:
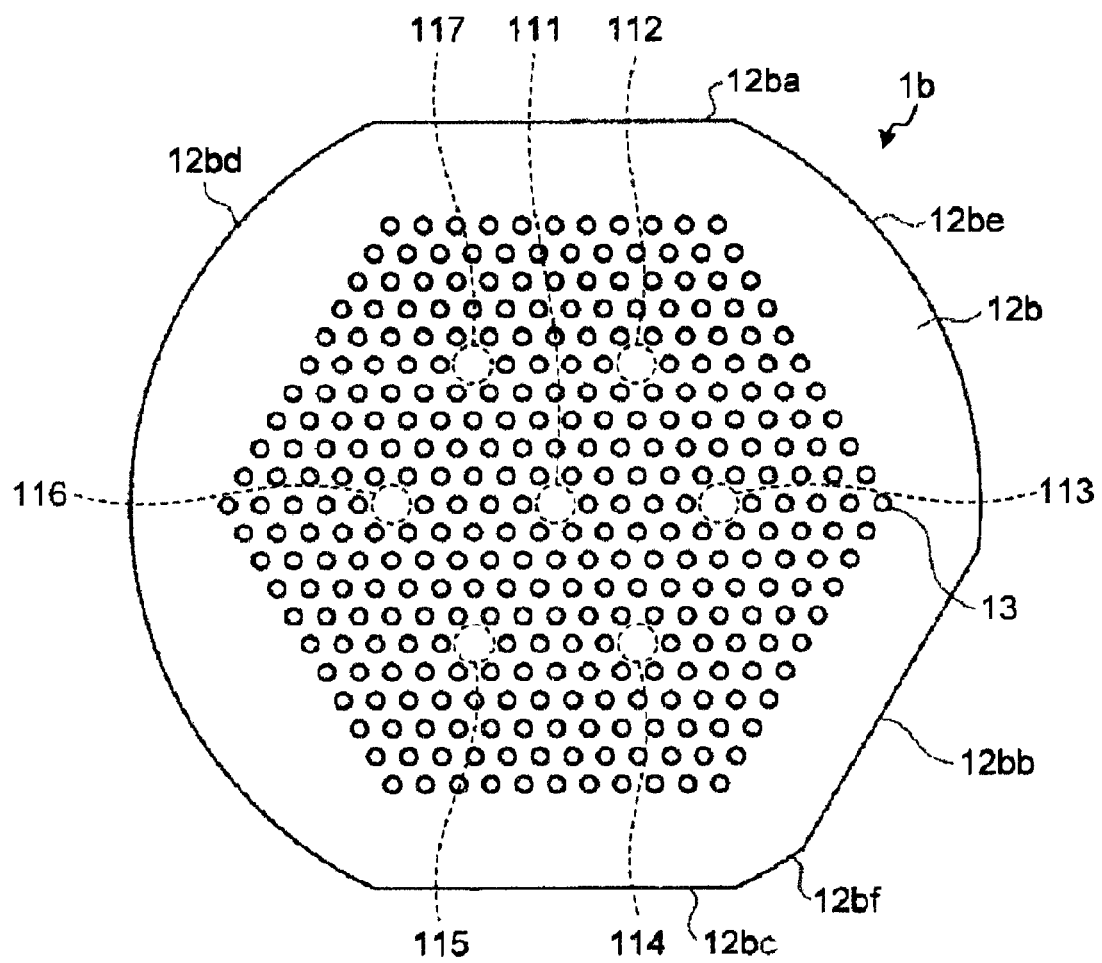
FIG. 2 is a schematic cross-sectional view of a multi-core HF according to a first modification.

Next, first to third modifications of the multi-core HF 1a according to the first embodiment will be explained below. FIG. 2 is a schematic cross-sectional view of a multi-core HF 1b according to the first modification. As illustrated in FIG. 2, the multi-core HF 1b has a configuration in which the cladding portion 12a of the multi-core HF 1a illustrated in FIG. 1 is replaced with a cladding portion 12b. An outer periphery of the cladding portion 12b includes three flat portions 12ba, 12bb, and 12bc, and remaining portions 12bd, 12be, and 12bf are circular. The flat portions 12ba, 12bb, and 12bc are located on an outer side of the core portions 112 and 117, an outer side of the core portions 113 and 114, and an outer side of the core portions 114 and 115, respectively. As a result, in the multi-core HF 1b, the core portion 115 and the core portion 117, for example, are easily distinguishable by the flat portions 12ba, 12bb, and 12bc.

More specifically, in the case of, for example, the multi-core HF 1a illustrated in FIG. 1, one of cross sections upon cutting the multi-core HF 1a is as illustrated in FIG. 1, while the other cross section opposite thereto becomes mirror-symmetrical to the cross section illustrated in FIG. 1. Here, the core portions 111 to 117 are arranged line-symmetrically with respect to a line connecting between, for example, the core portion 113 and the core portion 116. In addition, the flat portion 12aa is approximately perpendicular to this line of symmetry. If the cross section of a multi-core HF 1a is viewed, it is impossible to determine whether the cross section is the one illustrated in FIG. 1 or a cross section being mirror-symmetrical thereto. As a result, the positions of the core portion 115 and the core portion 117 are not distinguishable only from the arrangement of the core portions and the flat portion 12aa.

However, in the multi-core HF 1b according to the first modification, for both the cross section illustrated in FIG. 2 and the cross section opposite thereto, it is possible to determine that the one closer to, for example, the flat portion 12bb is the core portion 115. Therefore, in the multi-core HF 1b, the positions of the core portion 115 and the core portion 117 are more distinguishable, the positions of the other core portions are also more infallibly distinguishable, and thus the connection is further facilitated.

(Second Modification)

Figure 3:
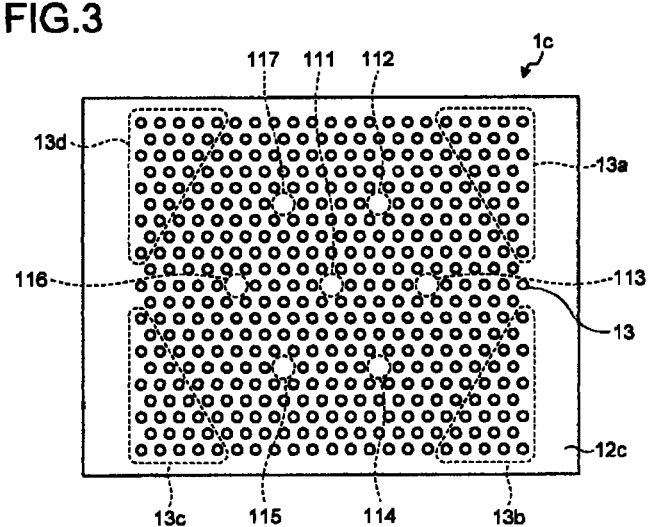
FIG. 3 is a schematic cross-sectional view of a multi-core HF according to a second modification.

FIG. 3 is a schematic cross-sectional view of a multi-core HF 1c according to a second modification. As illustrated in FIG. 3, the multi-core HF 1c has a configuration in which the cladding portion 12a of the multi-core HF 1a illustrated in FIG. 1 is replaced with a cladding portion 12c and groups of holes 13a to 13d are added thereto. The cladding portion 12c is shaped in a rectangle formed of four flat portions, and its size is, for example, 150×100 µm to 600×400 µm. Moreover, each of the groups of holes 13a to 13d has holes similar to the holes 13 and arranged in the same manner as the holes 13, and an area in which the holes 13 and the groups of holes 13a to 13d are formed is approximately rectangular. In the multi-core HF 1c also, a specific core portion is easily identifiable based on any one of the flat portions in the outer periphery of the cladding portion 12c.

(Third Modification)

Figure 4:
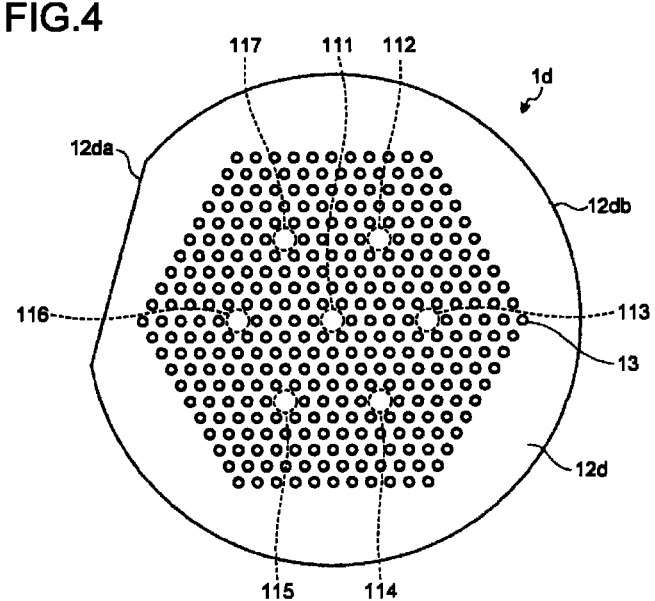
FIG. 4 is a schematic cross-sectional view of a multi-core HF according to a third modification.

FIG. 4 is a schematic cross-sectional view of a multi-core HF 1d according to a third modification. As illustrated in FIG. 4, the multi-core HF 1d has a configuration in which the cladding portion 12a of the multi-core HF 1a illustrated in FIG. 1 is replaced with a cladding portion 12d. An outer periphery of the cladding portion 12d includes a flat portion 12da, and a remaining portion 12db is circular.

The multi-core HF 1d includes one flat portion 12da similarly to the multi-core HF 1a, but it is possible to easily distinguish between, for example, the core portion 115 and the core portion 117.

More specifically, in the multi-core HF 1d, the flat portion 12da is inclined to, for example, the line connecting the core portion 113 and the core portion 116, being the line of symmetry of the arrangement of the core portions 111 to 117. Therefore, in both the cross section illustrated in FIG. 4 and a cross section opposite thereto, for example, a side to which the flat portion 12da is inclined so as to approach the side is determinable as the core portion 117. Therefore, in the multi-core HF 1d, only by one flat portion 12da, the positions of the core portion 115 and the core portion 117 are more infallibly distinguishable, the positions of the other core portions are also more infallibly distinguishable, and thus the connection is further facilitated.

Next, a method of manufacturing the multi-core HFs 1a to 1d according to the first embodiment and the first to third modifications will be explained below. The multi-core HFs 1a to 1d may be manufactured by using a well-known drill method, sol-gel method, or stack-and-draw method. If the stack-and-draw method is used, the following is implemented for the multi-core HFs 1a, 1b, and 1d. Inside, for example, a cylindrical pure silica-based glass tube of which a part of its outer periphery is cut off to form a flat portion, solid pure silica-based glass rods to become core portions are arranged, hollow pure silica-based glass capillaries to form holes are arranged around the glass rods, and space between the glass tube and the glass capillaries is filled with solid pure silica-based glass rods, to produce a glass preform. Thereafter, by drawing the glass preform, the multi-core HFs 1a, 1b, and 1d are able to be manufactured. When the multi-core HF 1c is to be manufactured, in the above method, for example, a glass tube whose inner and outer peripheries are rectangular may be used, or the inner and outer peripheries of a cylindrical glass tube may be cut off to produce a rectangular glass tube to be used.

Second Embodiment

Next, a second embodiment of the present invention will be explained. A multi-core optical fiber according to the second embodiment is of a type having a refractive-index difference between core portions and a cladding portion and light is confined to the core portions by this refractive-index difference.

FIG. 5 is a schematic cross-sectional view of a multi-core optical fiber according to the second embodiment. As illustrated in FIG. 5, a multi-core optical fiber 2 includes core portions 211 to 217 which are disposed separated from each other and a cladding portion 22 positioned around the core portions 211 to 217. The core portion 211 is arranged at an approximate center portion of the cladding portion 22, and the core portions 212 to 217 are arranged at respective apexes of an equilateral hexagon around the core portion 211. Each separated distance between the core portions 212 to 217 and the core diameters of the core portions 211 to 217 are not particularly limited. Each separated distance may be, for example, approximately 60 µm and the core diameter may be about 5.0 µm to 10.0 µm. Each of the core portions 211 to 217 is made of silica-based glass doped with germanium, and the cladding portion 12 is made of pure silica glass. As a result, the cladding portion 22 has a refractive index lower than a refractive index of each of the core portions 211 to 217, and a relative refractive-index difference of each of the core portions 211 to 217 with respect to the cladding portion 22 is approximately 0.3% to 1.5%. The multi-core optical fiber 2 confines the light to each of the core portions 211 to 217 by this refractive-index difference to propagate the light.

Moreover, the outer periphery of the cladding portion 22 includes a flat portion 22a in a part thereof, and a remaining portion 22b is circular. As a result, in the multi-core optical fiber 2 also, identification of a specific core portion is facilitated based on the position of the flat portion 22a.

This multi-core optical fiber 2, similarly to the multi-core HFs 1a to 1d, may be manufactured using a well-known drill method, sol-gel method, or stack-and-draw method. When the stack-and-draw method is used, in the manufacturing method, the pure silica-based glass capillaries are replaced with solid glass rods, and the glass rods to become core portions are made of silica-based glass doped with germanium of a predetermined amount.

In the multi-core optical fiber 2 according to the second embodiment, the flat portion may be inclined, a plurality of flat portions may be provided, or the outer periphery of the cladding portion may be rectangular.

In the multi-core HF 1c according to the second modification also, each of the flat portions may be inclined to the line of symmetry of the arrangement of the core portions.

Each of the first and the second embodiments and the modifications thereof is just an example, and the number and arrangement of the core portions, of the holes for confining the light to the core portions, and of the flat portions are not particularly limited. Moreover, the material of the multi-core optical fiber is not particularly limited.

According to an embodiment of the present invention, it is possible to easily identify a position of a specific core portion, and thus there is an effect that it is possible to realize a multi-core optical fiber that is easily connected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-core optical fiber, comprising:
a plurality of core portions; and
a cladding portion positioned around the plurality of core portions and including, in a cross section of the cladding portion, a flat portion in at least a part of an outer periphery of the cladding portion and a remaining portion of the outer periphery that is circular, the cross section being perpendicular to a longitudinal direction of the cladding portion, wherein
the flat portion of the cladding portion is not parallel to any axis of symmetry formed with respect to the arrangement of the plurality of core portions in the cross section.

2. The multi-core optical fiber according to claim 1, wherein the cladding portion includes a plurality of holes arranged around the plurality of core portions, and light is confined to each of the plurality of core portions by the plurality of holes.

3. The multi-core optical fiber according to claim 1, wherein the cladding portion has a refractive index lower than a refractive index of each of the plurality of core portions, and light is confined to each of the plurality of core portions by a refractive-index difference between the cladding portion and each of the plurality of core portions.

4. The multi-core optical fiber according to claim 1, wherein the flat portion of the cladding portion is angularly offset in the cross section with respect to any axis of symmetry formed with respect to the arrangement of the plurality of core portions.

5. The multi-core optical fiber according to claim 1, wherein the flat portion of the cladding portion is not perpendicular to any axis of symmetry formed with respect to the arrangement of the plurality of core portions in the cross section.

* * * * *